United States Patent
Petersson

(10) Patent No.: US 7,882,803 B2
(45) Date of Patent: Feb. 8, 2011

(54) TEAT CUP INFLATION

(76) Inventor: Lennart Petersson, 229 SE. Main St., Douglas, MA (US) 01516

( * ) Notice: Subject to any disclaimer, the term of this patent is extended or adjusted under 35 U.S.C. 154(b) by 249 days.

(21) Appl. No.: 11/900,669

(22) Filed: Sep. 12, 2007

(65) Prior Publication Data

US 2008/0072825 A1    Mar. 27, 2008

Related U.S. Application Data

(60) Provisional application No. 60/847,077, filed on Sep. 22, 2006.

(51) Int. Cl.
*A01J 5/04* (2006.01)
(52) U.S. Cl. .................................. 119/14.47
(58) Field of Classification Search ............ 119/14, 119/14.47, 14.52
See application file for complete search history.

(56) References Cited

U.S. PATENT DOCUMENTS

| | | | | |
|---|---|---|---|---|
| 2,092,605 A | * | 9/1937 | Hodsdon | 119/14.53 |
| 2,340,296 A | * | 2/1944 | Bender | 119/14.02 |
| 2,502,362 A | * | 3/1950 | Babson et al. | 119/14.52 |
| 2,621,626 A | * | 12/1952 | Harris et al. | 119/14.52 |
| 2,853,971 A | * | 9/1958 | Bajema | 119/14.52 |
| 4,324,201 A | * | 4/1982 | Larson | 119/14.51 |
| 4,372,250 A | * | 2/1983 | Larson | 119/14.47 |
| 4,604,969 A | * | 8/1986 | Larson | 119/14.36 |
| 4,869,205 A | * | 9/1989 | Larson | 119/14.51 |
| 5,007,378 A | * | 4/1991 | Larson | 119/14.47 |
| 6,435,132 B1 | * | 8/2002 | Milbrath et al. | 119/14.47 |
| 6,546,893 B1 | * | 4/2003 | Happel et al. | 119/14.47 |
| 2009/0050061 A1 | * | 2/2009 | Duke | 119/14.02 |

* cited by examiner

*Primary Examiner*—Rob Swiatek
*Assistant Examiner*—Ebony Evans
(74) *Attorney, Agent, or Firm*—Terry M. Crellin

(57) ABSTRACT

An inflation for a milking machine is formed to have an elongate, hollow barrel. The barrel terminates in open upper and lower ends. An elongate reinforcement element comprising a relatively narrow raised rib is molded integrally along an outer surface of the barrel. The raised ribs provide added integrity for the sidewalls of the barrel and greatly improved massage to the teat tissue.

22 Claims, 2 Drawing Sheets

TEAT CUP INFLATION

CROSS-REFERENCE TO RELATED APPLICATIONS

This application is entitled to the filing date of U.S. Provisional Application No. 60/847,077 titled "Teat Cup Inflation" and filed on Sep. 22, 2006.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

1. Field of the Invention

The present invention relates to teat cup inflations used in teat cup assemblies for milking cows. In particular, the invention relates to an inflation that is a one-piece, molded, elastomeric member having a hollow elongate barrel that has a substantially triangular cross-sectional shape.

2. Description of Related Art Including Information Disclosed Under 37 CFR 197 and 198

There has been much effort made in the past to provide improved teat cup inflations that massage the teats of a cow and otherwise are designed to be less likely to cause mastitis in the teats of the cows being milked. Attention is directed to U.S. Pat. Nos. 3,659,558 and 3,967,587 wherein there is generally specified the inadequacies of the prior art inflations, particularly as to undesirable conditions imposed on the teats of a cow by inflations of the prior art.

An improved inflation is disclosed in U.S. Pat. No. 3,967,587 in which the barrel of the inflation has a substantially square cross-sectional shape. At the upper or proximate end of the barrel there is a cylindrical head molded integrally to the barrel. The head has a reversely extending flange that fits over the upper end of the shell of the teat cup assembly. A mouthpart or diaphragm is provided at the upper end of the cylindrical head, with the mouthpart having a central opening for receiving the teat of a cow.

The square-shaped inflation was a significant advancement in the art and was used widely by dairies. However, current demands on the management aspects of dairying have resulted in drastically increased milk production as well as improved man-hour efficiencies. The increase in milk production has put greater demands on physiological systems of the dairy cow, milking systems and the design of milking inflations. This puts additional demands on the capacity of milking components, since a milking system that is experiencing excessive fluid flow, increases instability that ultimately can result in an undesirable decrease in milkout performance. It would be highly advantageous to develop alternative inflations having a different cross-sectional shape that would achieve or surpass the performance of the square-shaped inflation of the prior art to meet the demands of the present dairy industry.

In U.S. Pat. No. 5,482,004, issued on Jan. 9, 1996, teat cup liners, i.e., inflations, are disclosed which are especially designed to provide a differential resistance to inward collapse along the length of the teat receiving region of the barrel of the inflations. The purpose being to allow the inflations to accommodate teats of varying lengths. According to the teaching of U.S. Pat. No. 5,482,004, means are provided for creating a differential resistance to inward collapse of the teat receiving region along the length of the teat receiving region. One embodiment of such means which is disclosed in U.S. Pat. No. 5,482,004 consists of a plurality of axially extending, circumferentially spaced ribs having a maximum width and a maximum thickness at the uppermost end of the inflation, with both the width and the thickness decreasing or becoming smaller along the length of the rib. There is no suggestion whatsoever or any motivation whatsoever given in U.S. Pat. No. 5,483,004 of ribs having constant or uniform width and/or thickness in the teat receiving region of the barrel, nor is there any suggestion or motivation whatsoever that ribs of constant or uniform width and/or thickness in the teat receiving region of a triangular-shaped inflation would result in any benefit of any kind, let alone the unexpected results achieved in accordance with the present invention.

In U.S. Pat. No. 6,776,120, issued Aug. 17, 2004, round teat cup liners, i.e., inflations having a circular cross-sectional shape, are disclosed in which one of three elements are required. First, the thickness of the barrel of the inflation must decrease in size in a direction from the upper end of the inflation to the lower end. Second, elongate ribs are formed in the outer surface of the barrel of the inflation, and the elongate ribs have a thickness extending outwardly from the barrel, with the thickness increasing in size in a direction from the upper end of the inflation to the lower end. Third, that both the elements mentioned in the previous two sentences are present. There is absolutely no suggestion of ribs which are uniform in their thickness, instead, the ribs must increase in their thickness. Further, there is no suggestion of using the ribs on a triangular-shaped inflation, the inflations have a circular cross-section in the teat receiving portion of the barrel. There is no suggestion or any motivation whatsoever given in U.S. Pat. No. 6,776,120 of ribs having constant or uniform thickness in the teat receiving region of the barrel, nor is there any suggestion or motivation whatsoever that ribs of constant or uniform thickness in the teat receiving region of a triangular-shaped inflation would result in any benefit of any kind, let alone the unexpected results achieved in accordance with the present invention.

BRIEF SUMMARY OF THE INVENTION

A principal objective of the invention is to provide a triangular-shaped inflation which achieves rapid, efficient milkout while also reducing and minimizing stress to the tissue of the teats of the cow being milked.

A specific objective of the present invention is to provide a triangular-shaped inflation which achieves an improvement in long term health aspects of the teats of the cows being milked due to improvement in the ability of the inflation to exert optimum massage, which will be discussed further hereinafter, during the collapsed phase of the operation of the inflation.

Another objective of the present invention is to provide a triangular-shaped inflation that provides improved massaging of the teat of a dairy cow as a result of the improvement in its ability to exert optimum massage on the teats of the cow during the collapse phase of the operation of the inflation.

The above objectives are achieved in accordance with the present invention by providing novel, unique improvements in the triangular-shaped inflations of the prior art that unexpectedly produce a significant enhancement in the milking performance while at the same time improve or maintain good teat and udder health of the cows being milked. Triangular-shaped inflations, as are well known in the art, have an elongate, hollow barrel that is substantially triangular in cross-sectional shape. A substantially cylindrical head is molded integrally to the upper end of the triangular-shaped barrel. The head comprises a substantially cylindrical side wall that has a diameter greater than the outer diagonal dimension of the barrel. A mouthpart, a diaphragm-like member, extends across the otherwise open, upper end of the cylindrical side wall. The mouthpart has a central opening that is adapted to accommodate, i.e., receive therethrough, a teat of an animal that is to be milked. A transition section is molded in the head to connect the upper end of the barrel with an inner surface of the cylindrical side wall of the head.

In accordance with the present invention, each of the three longitudinal sidewalls of the triangular-shaped inflation has at least one elongate, relatively narrow raised rib molded integrally along the outer surface thereof. Each of the raised ribs has an upper end that is located adjacent to the open upper end of the hollow barrel and a lower end that is located at a position along the longitudinal length of the hollow barrel. The position of the lower end of each of the ribs is located at a distance of between about one-half to three-fourths the total longitudinal length of the hollow barrel from the open upper end of the hollow barrel. Each rib has a predominant portion that has a substantially uniform thickness extending from the outer surface of the barrel in a direction substantially perpendicular to the longitudinal axis of the barrel. The predominant portion, i.e., that portion having a substantially uniform thickness, begins at the upper end of the rib, that is, adjacent to the open upper end of the hollow barrel, and the predominant portion extends continuously down the longitudinal length of the barrel by a distance that is at least about one-half the total longitudinal length of the hollow barrel. A less predominant portion of the rib located below the end position of the predominant portion has a thickness that gradually diminishes or tapers in a direction along the longitudinal length of the barrel to the lower end of the rib. This lower, less predominant portion of the rib is tapered simply to facilitate the removal of the inflation from the mold cavity in which the inflation is formed. Otherwise, the less predominant portion of the rib has no function and could be eliminated if means were available or found to achieve removal of the inflation from the mold cavity in which the inflation is molded.

The improved triangular-shaped inflation having the raised ribs has been found to result in an unexpected, significant improvement in milking efficiency and performance, while at the same time maintaining good teat and udder health or actually improving the health of the teat and udder. During the collapsed phase of the operation of the inflation when milking a cow, the raised ribs on the triangular-shaped inflation causes the inflation to exert improved pressure on the tissue of the teat that is positioned in the inflation. Normal triangular-shaped inflations have less ability to exert compressive load on a teat. The triangular-shaped inflations having the raised ribs in accordance with the present invention have been found to unexpectedly have excellent, superior ability to exert adequate massage on a teat. As a result greatly improved, beneficial massaging that promotes healthy teats is achieved during the milking. The triangular-shaped inflations having the raised ribs in accordance with the present invention have further been found to be generally superior to prior art inflations as a whole in all respects. Many dairy operators have simply noted that the triangular-shaped inflations having the raised ribs in accordance with the present invention were the best, most efficient, and most healthy teat promoting inflations that they have ever used.

Additional objects and features of the invention will become apparent from the following detailed description, taken together with the accompanying drawings.

BRIEF DESCRIPTION OF THE SEVERAL VIEWS OF THE DRAWINGS

Preferred embodiments of the present invention representing the best mode presently contemplated of carrying out the invention are illustrated in the accompanying drawings in which.

DETAILED DESCRIPTION OF THE INVENTION

Figure 1:
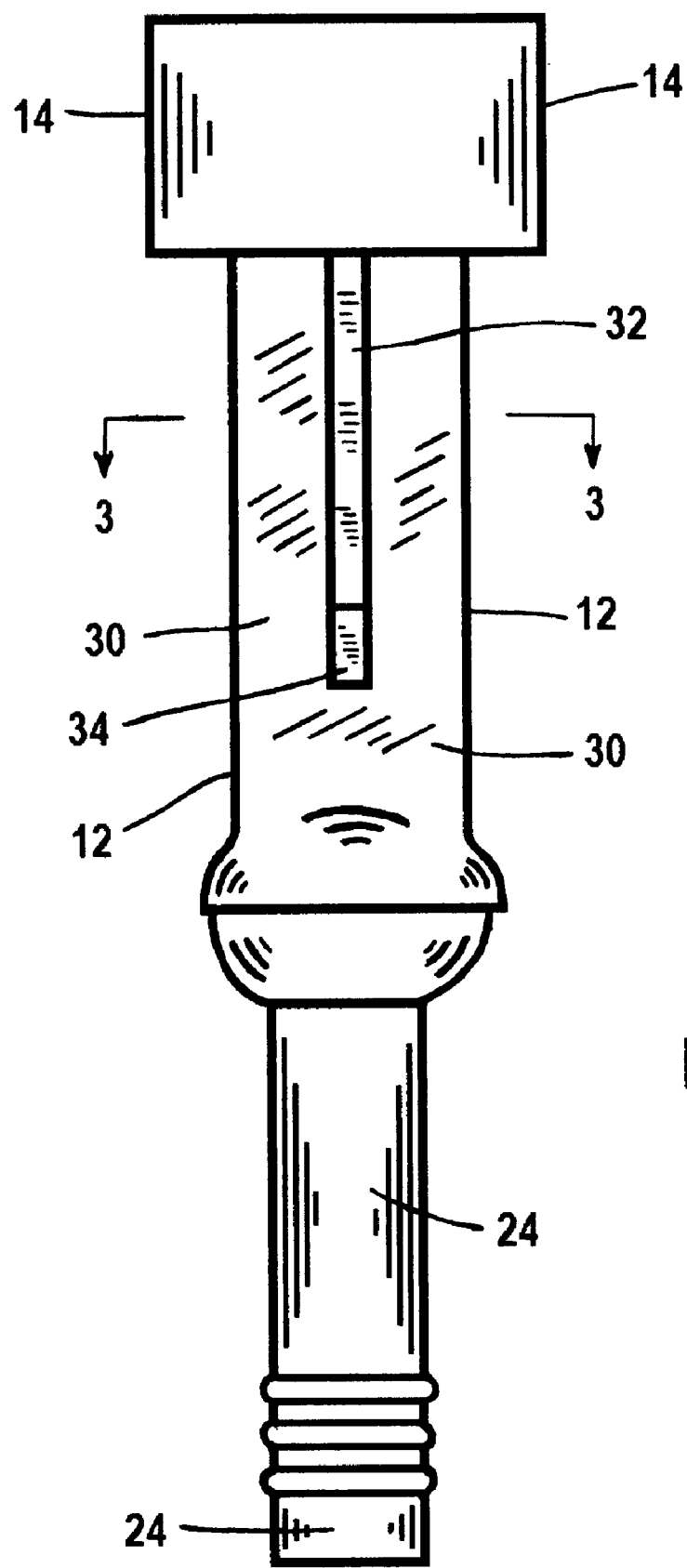
FIG. 1 is an elevation view of a triangular-shaped inflation incorporating the improvements of the present invention, with the inflation being viewed looking at a substantially flat sidewall of the barrel as shown by line 1-1 of FIG. 3.
Figure 2:
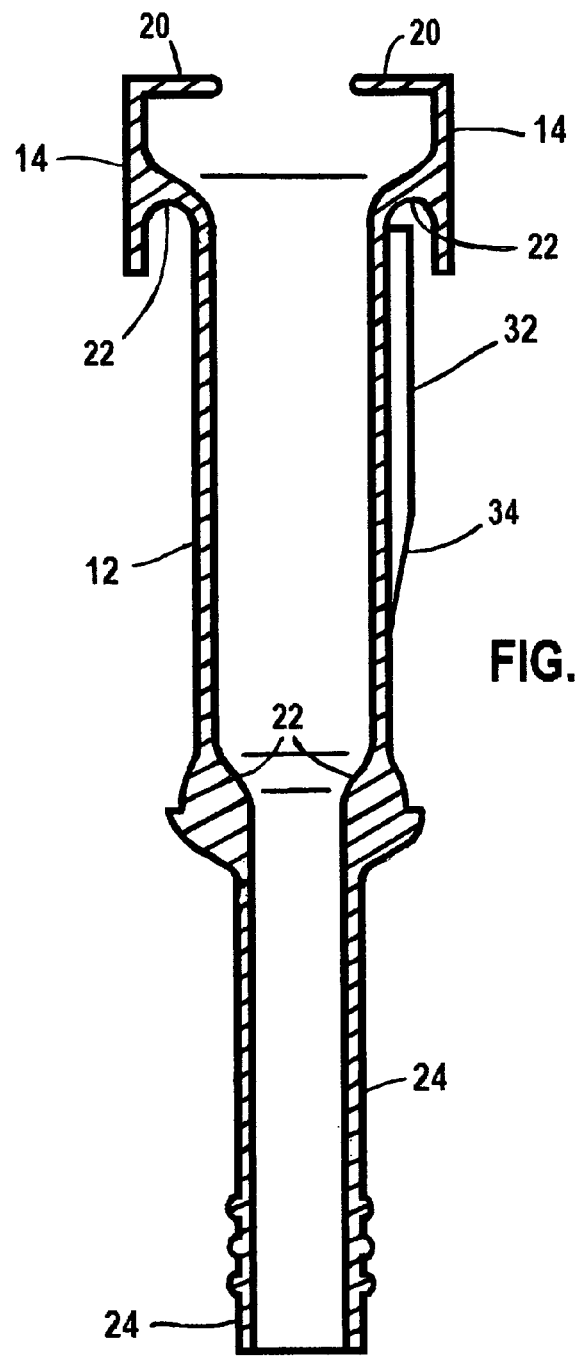
FIG. 2 is a horizontal cross section through the inflation of FIG. 1 taken along line 2-2 of FIG. 3.
Figure 3:
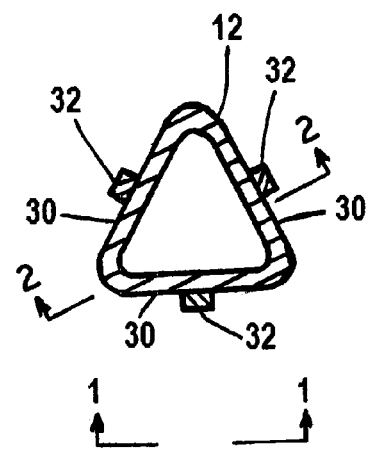
FIG. 3 is a vertical cross section through the inflation of FIG. 1 taken along line 3-3 of FIG. 1 showing the rib portion of one sidewall of the inflation in elevation, and FIG. 3 also shows the transition sections of the inflation between the barrel and the cylindrical head of the inflation and the mouth.

In accordance with the present invention, an improved inflation is provided for a teat cup assembly of a milking machine. The inflation is molded as an integral unit from an elastomeric material. The inflation comprises an elongate, hollow barrel 12 that has a substantially triangular cross-sectional shape and terminates in open upper and lower ends. A substantially cylindrical head 14 is molded integrally to the upper end of the barrel 12. The head 14 is substantially cylindrical, with the cylindrical sidewall of the head 14 having an inner diameter that is greater than a diameter of a circle drawn through the three apexes of the triangular-shaped barrel 12. A diaphragm-like mouthpart 20 is positioned across the otherwise open, upper end of the cylindrical sidewall of the head 14. The mouthpart 20 has a central opening that is adapted to accommodate the teat of an animal to be milked.

The cylindrical sidewall of the head 14 is connected to the barrel 12 by a transition section 22 that is molded in the head 14 so as to connect the upper end of the barrel 12 with an inner surface of the cylindrical sidewall of the head 14. An internal, mouthpiece chamber is formed between the transition section and the mouthpart 20. The transition section 22 has an outwardly curved surface that curves from the upper end of the barrel 12 and joins the inner surface of the cylindrical sidewall of the head 14. An elongate, cylindrical, hollow tailpiece 24 extends from the lower end of the barrel 12. A second transition section 22 has an outwardly curved surface that curves from the lower end of the barrel 12 and joins the inner surface of the triangular sidewall 30 of the barrel 12 to the cylindrical sidewall of the tailpiece 24.

Each of the three longitudinal sidewalls 30 of the hollow barrel 12 has at least one relatively narrow raised rib 32 molded integrally along an outer surface of each of the sidewalls 30. Each raised rib 32 has an upper end that is located adjacent to the open upper end of the hollow barrel 12. Each raised rib 32 extends downwardly toward the lower end of the hollow barrel 12, with each raised rib 32 having a uniform or constant thickness in a radial direction extending away from the outer surface of a respective sidewall 30. That thickness can be between about 1/16 of an inch and 3/16 of an inch, and preferably about 1/8 of an inch. The width of the raised ribs is preferably uniform or constant, and like the thickness can be between about 1/16 of an inch and 3/16 of an inch, and preferably about 1/8 of an inch.

Each raised rib 32 extends downwardly from its upper end to a lower end that is located about 7/16 to about 9/16 way down the longitudinal length of the respective sidewall 30 of the hollow barrel 12. Preferably, each raised rib 32 extends downwardly to a position about 1/2 way down the longitudinal length of the respective sidewall 30 of the hollow barrel 12. A short, tapered terminal end 34 is formed integrally with and extends downwardly from the lower end of each raised rib 32. The terminal end 34 tapers so that its lower end joins the surface of the respective sidewall 30. The terminal end 34 has a length such that the lower end of the terminal end 32 will be spaced no more than about 3/4 of the longitudinal length of the hollow barrel 12 from the open upper end of the hollow barrel 12. As mentioned previously, the tapered terminal end 34 is provided simply to facilitate removal of the inflation from the mold cavity in which the inflation is formed. If the inflation is formed without being molded in a mold cavity, or if a mold cavity can be formed which will readily allow release of the ribs 32 and sidewalls 30, then the terminal end 34 of the ribs 32 can be eliminated.

Two or three, spaced apart, raised ribs 32 can be formed on each sidewall 30 if desired, but it has been found that one such rib 32 is sufficient. If multiple ribs are used, they should be spaced relatively close to each other. When a single raised rib 32 is used, it is preferably oriented so as to be substantially parallel to longitudinal side edges of its respective sidewall 30. It is further advantageous to position the single raised rib 32 in the near vicinity of a longitudinal axis that is substantially equidistant from the longitudinal side edges of its respective sidewall 30. If two or three raised ribs 32 are formed on each sidewall 30, they should be oriented so as to be substantially parallel to longitudinal side edges of the respective sidewall 30, and the group of raised ribs should be located centrally along the sidewall 30 so that the outer ribs of each group are spaced equidistant from the opposed side edges of the respective sidewall 30.

The invention claimed is:

1. An improvement in an inflation for an automatic milking machine in which said inflation has (a) an elongate, hollow barrel that terminates in an open upper end and an open lower end and said barrel has a substantially uniform shape extending from said upper end to said lower end thereof, and (b) a head is formed at said upper end of said barrel, with said head having a mouthpart positioned across an otherwise open, uppermost end of said head and said mouthpart has a central opening that is adapted to accommodate a teat of an animal to be milked, said improvement comprising at least one elongate reinforcement element comprising a relatively narrow raised rib molded integrally along a surface of said barrel;

each said raised rib having a top end that is located adjacent to said upper end of said barrel; and each said raised rib extending along a longitudinal length of said barrel, with a bottom end of each said rib being spaced from said upper end of said barrel by a distance of at least one-half to no more than three-fourths of said longitudinal length of said barrel.

2. The improved inflation in accordance with claim 1 wherein each said raised rib is molded integrally along an outer surface of said barrel.

3. The improved inflation in accordance with claim 1 wherein each said raised rib has a uniform thickness in a radial direction extending away from said outer surface of said barrel.

4. The improved inflation in accordance with claim 3 wherein said thickness is between about 1/16 inch and 3/16 inch.

5. The improved inflation in accordance with claim 3 wherein each said raised rib has a uniform width.

6. The improved inflation in accordance with claim 5 wherein said width is between about 1/16 inch and 3/16 inch.

7. The improved inflation in accordance with claim 1 wherein each said raised rib has first and second sections;

said first section extending from its proximal end located at said upper end of said barrel a distance of between 7/16 and 9/16 of said longitudinal length of said barrel; and said second section extending from a distal end of said first section;

said second section being tapered so that its lowermost end joins said surface of said barrel; and said lowermost end of said second section is spaced from said upper end of said barrel by no more than about 3/4 of said longitudinal length of said barrel.

8. The improved inflation in accordance with claim 7 wherein said first section of each said raised rib has a uniform thickness in a radial direction extending away from said surface of said barrel.

9. The improved inflation in accordance with claim 8 wherein said thickness is between about 1/16 inch and 3/16 inch.

10. The improved inflation in accordance with claim 8 wherein said first section of each said raised rib has a uniform width.

11. The improved inflation in accordance with claim 10 wherein said width is between about 1/16 inch and 3/16 inch.

12. An improvement in an inflation for an automatic milking machine in which said inflation has an elongate, hollow barrel that terminates in an open upper end and an open lower end and a head is formed at said upper end of said barrel, with said head having a mouthpart positioned across an otherwise open, uppermost end of said head and said mouthpart has a central opening that is adapted to accommodate a teat of an animal to be milked, said improvement comprising said barrel has a substantially uniform triangular cross-section extending from said upper end to said lower end thereof, such that said barrel has three longitudinal sidewalls;

each of said longitudinal sidewalls having at least one elongate reinforcement element, said reinforcement element comprising a relatively narrow raised rib molded integrally along a surface of each of said longitudinal sidewalls;

each said raised rib having a top end that is located adjacent to said upper end of said barrel; and each said raised rib extending along a longitudinal length of said barrel, with a bottom end of each said rib being spaced from said upper end of said barrel by a distance of at least 1/2 to no more than 3/4 of said longitudinal length of said barrel.

13. The improved inflation in accordance with claim 12 wherein each said raised rib is molded integrally along an outer surface of said barrel.

14. The improved inflation in accordance with claim 12 wherein each said raised rib has a uniform thickness in a radial direction extending away from said surface of each of said longitudinal sidewalls of said barrel.

15. The improved inflation in accordance with claim 14 wherein each said raised rib has a uniform width.

16. The improved inflation in accordance with claim 15 wherein said width is between about 1/16 inch and 3/16 inch.

17. The improved inflation in accordance with claim 12 wherein said thickness is between about 1/16 inch and 3/16 inch.

18. The improved inflation in accordance with claim 12 wherein each said raised rib has first and second sections;

said first section extending from its proximal end located at said upper end of said barrel a distance of between 7/16 and 9/16 of said longitudinal length of said barrel; and said second section extending from a distal end of said first section;

said second section being tapered so that its lowermost end joins said surface of a respective longitudinal sidewall of said barrel; and said lowermost end of said second section is spaced from said upper end of said barrel by no more than about 3/4 of said longitudinal length of said barrel.

19. The improved inflation in accordance with claim 18 wherein said first section of each said raised rib has a uniform thickness in a radial direction extending away from said surface of said barrel.

20. The improved inflation in accordance with claim 19 wherein said thickness is between about 1/16 inch and 3/16 inch.

21. The improved inflation in accordance with claim 20 wherein said first section of each said raised rib has a uniform width.

22. The improved inflation in accordance with claim 21 wherein said width is between about 1/16 inch and 3/16 inch.

* * * * *